United States Patent
Roehrle et al.

(10) Patent No.: US 9,820,185 B2
(45) Date of Patent: Nov. 14, 2017

(54) ELECTRONIC DEVICE, CONTROLLER AND CONTROL METHOD FOR NFC

(71) Applicant: Sony Corporation, Tokyo (JP)

(72) Inventors: Klaus Roehrle, Ostfildern (DE); Yo Tabayashi, Stuttgart (DE); Meik Buscemi, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/325,109

(22) PCT Filed: Jul. 15, 2015

(86) PCT No.: PCT/EP2015/066158
§ 371 (c)(1),
(2) Date: Jan. 10, 2017

(87) PCT Pub. No.: WO2016/008921
PCT Pub. Date: Jan. 21, 2016

(65) Prior Publication Data
US 2017/0188262 A1    Jun. 29, 2017

(30) Foreign Application Priority Data

Jul. 17, 2014    (EP) .................................... 14177499

(51) Int. Cl.
*H04B 5/00*    (2006.01)
*H04W 4/00*    (2009.01)
(Continued)

(52) U.S. Cl.
CPC .......... *H04W 28/044* (2013.01); *H04W 4/008* (2013.01); *H04W 12/06* (2013.01)

(58) Field of Classification Search
CPC ....... H04W 4/008; H04W 8/22; H04W 12/02; H04W 12/06; H04W 12/12;
(Continued)

(56) References Cited

U.S. PATENT DOCUMENTS

| 7,699,228 B2* | 4/2010 | Wakasa ............. G06F 17/30905 |
| | | 235/472.01 |
| 7,797,537 B2* | 9/2010 | Kurita ................... H04L 9/0844 |
| | | 455/41.1 |

(Continued)

FOREIGN PATENT DOCUMENTS

| CN | 101719830 B | 9/2012 |
| EP | 2 442 254 A2 | 4/2012 |

(Continued)

OTHER PUBLICATIONS

International Search Report and Written Opinion dated Oct. 13, 2015 in PCT/EP2015/066158 filed Jul. 15, 2015.

(Continued)

*Primary Examiner* — Quochien B Vuong
(74) *Attorney, Agent, or Firm* — Oblon, McClelland, Maier & Neustadt, L.L.P.

(57) ABSTRACT

An electronic device for near field communication (NFC) includes a processor including one or more applications and a controller controlling NFC communication between a reader/writer device and the processor. The controller includes a communication unit that exchanges communication between the external reader/writer device and the processor. A parser parses communication exchanged between the reader/writer device and the processor. The parser is configured to detect a predetermined setting of a response code within an authentication response sent by the processor in response to an authentication request received from the reader/writer device, the predetermined setting indicating that an application of the processing unit is in an authenticated state. A further controller controls the communication unit not to respond to an anti-collision request received from the reader/writer device and/or not to forward an anti-
(Continued)

collision request to the processor if the anti-collision request is directed to an application in an authenticated state.

14 Claims, 7 Drawing Sheets

(51) Int. Cl.
    *G05B 19/00*     (2006.01)
    *G06F 7/04*     (2006.01)
    *H04W 28/04*     (2009.01)
    *H04W 12/06*     (2009.01)

(58) Field of Classification Search
    CPC .. H04W 28/044; H04W 48/02; H04B 3/0056; H04B 5/0031; H04B 5/0056; H04B 5/0062; H04B 5/0075; H04B 7/26; H04M 1/7253; H04M 2250/04; H04M 2250/14
    USPC ........ 455/41.1, 41.2, 410, 411; 340/5.2, 5.8, 340/10.1, 10.42, 10.51; 726/21, 26, 29
    See application file for complete search history.

(56) References Cited

U.S. PATENT DOCUMENTS

| | | | | |
|---|---|---|---|---|
| 8,143,995 | B2 * | 3/2012 | Soppera | H04L 9/3263 340/5.8 |
| 8,259,946 | B2 * | 9/2012 | Takemura | G06K 7/0008 380/270 |
| 8,576,053 | B2 * | 11/2013 | Buscemi | G06K 7/10297 340/10.1 |
| 8,929,815 | B2 * | 1/2015 | Lee | H04M 1/7253 455/41.1 |
| 9,373,110 | B2 * | 6/2016 | Sekiya | G06Q 20/3278 |
| 9,456,347 | B2 * | 9/2016 | Hsu | H04W 12/06 |
| 2008/0306849 | A1 | 12/2008 | Johnson, Jr. et al. | |
| 2011/0078549 | A1 | 3/2011 | Thueringer et al. | |
| 2011/0183611 | A1 | 7/2011 | Wane | |
| 2012/0092137 | A1 | 4/2012 | Buscemi et al. | |
| 2012/0178366 | A1 | 7/2012 | Levy et al. | |
| 2012/0329393 | A1 | 12/2012 | Hillan et al. | |
| 2013/0205414 | A1 | 8/2013 | Jussila | |
| 2015/0237664 | A1 * | 8/2015 | Tanabe | G06Q 20/3278 455/41.1 |

FOREIGN PATENT DOCUMENTS

| | | |
|---|---|---|
| EP | 2 442 254 A3 | 4/2012 |
| EP | 2 624 612 A1 | 8/2013 |
| EP | 2 711 864 A1 | 3/2014 |

OTHER PUBLICATIONS

Taiwanese Search Report dated Nov. 9, 2010 in Taiwanese Application 104120185.

"Mobile NFC Technical Guidelines", GSMA, Version 2.0, Nov. 2007, 95 pages.

"Smart Cards: UICC—Contactless Front-end (CLF) Interface; Part 1: Physical and data link layer characteristics (Release 7)", ETSI TS 102 613, Version 7.3.0, Technical Specification, Release 7, Sep. 2008, 57 pages.

* cited by examiner

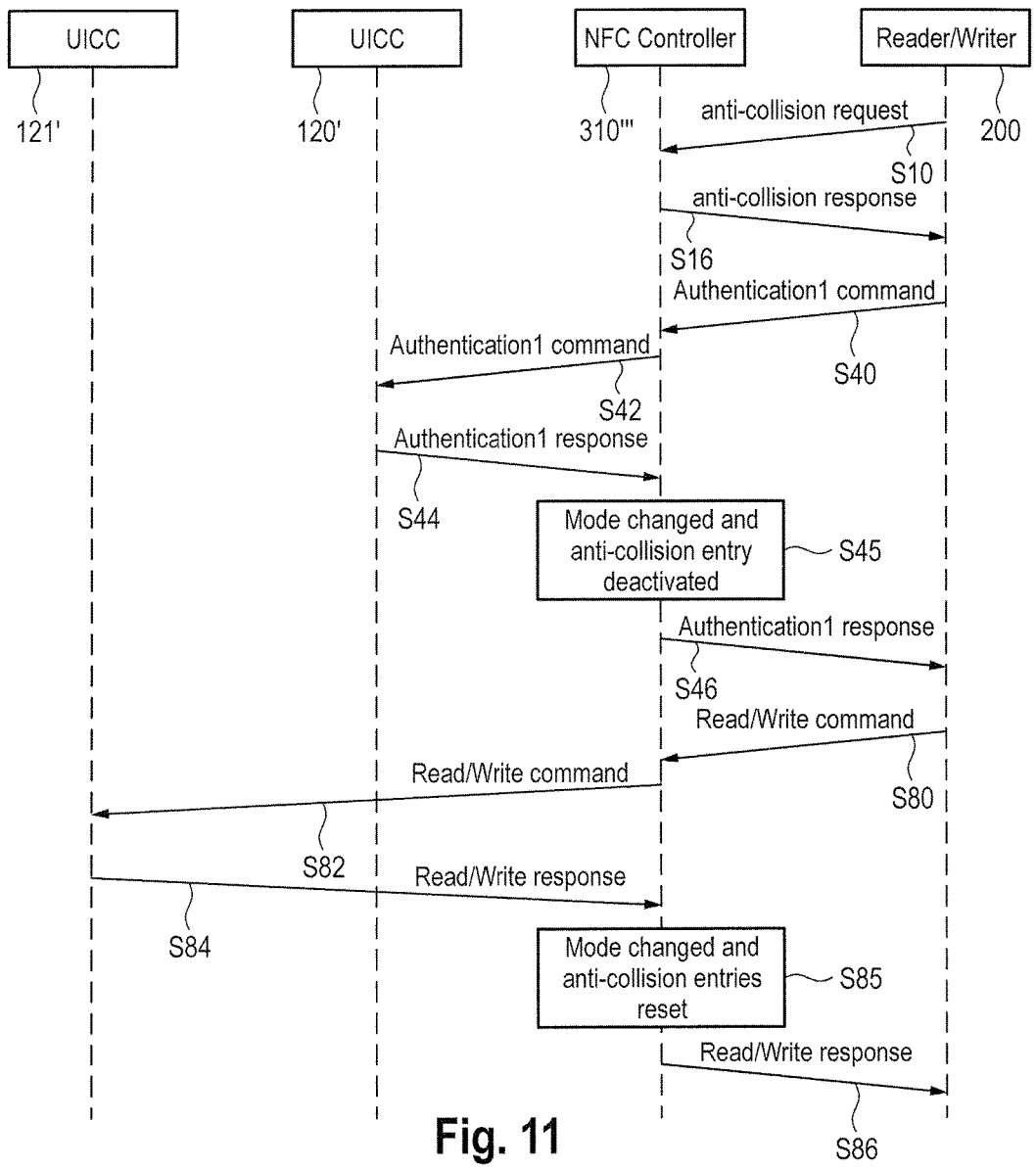

ELECTRONIC DEVICE, CONTROLLER AND CONTROL METHOD FOR NFC

CROSS-REFERENCE TO RELATED APPLICATIONS

The present application is based on PCT filing PCT/EP2015/066158 filed Jul. 15, 2015, and claims priority to European Patent Application 14177499.2 filed by the European Patent Office on 17 Jul. 2014, the entire contents of each of which being incorporated herein by reference.

BACKGROUND

Field of the Disclosure

The present disclosure relates to an electronic device for near field communication (NFC) including a processing unit including one or more applications and a controller for controlling NFC communication between a reader/writer device and the processing unit. The present disclosure relates further to a controller, a control method, an electronic system and a medium.

Description of Related Art

The NFC Forum, a non-profit industry association whose member organizations share development, application, and marketing expertise to develop the best possible solutions for advancing the use of NFC, has defined the NFC controller interface in "NFC CONTROLLER INTERFACE (NCI)", Technical Specification, Version 1.1, Oct. 25, 2013, which describes different mechanisms to configure the NFC controller (NFCC) and to exchange data with the NFC controller and other entities within a device.

NCI defines how to handle the anti-collision for the Device Host (DH) in FeliCa™. In theory, it could also handle the anti-collision not only for the DH but also for other entities, e.g. the UICC (Universal Integrated Circuit Card; also called SIM). Today, the anti-collision for the UICC is handled by the UICC itself. The NFC Controller receives the anti-collision request, forwards this request to the UICC, the UICC generates a response (if required) and sends the response to the NFC Controller.

Security related FeliCa applications have an internal state which depends on whether the authentication with a reader/writer device succeeded or not. The default state (also called non-authenticated state herein) is "Mode 0". Once the mutual authentication with the reader/writer device is done and the secure connection is established the application is in state "Mode 2" (also called authenticated state herein). An anti-collision request from a reader/writer shall only be handled in "Mode 0". The "Mode 0" is left as soon as the first authentication command is received. In any other state the anti-collision request is ignored and nothing is sent to the reader/writer device.

The problem to be solved is that this behavior depends on the state of the corresponding application, which is running on the processing unit and not on the NFC controller. Hence, there is a need to provide a solution to enable the NFC controller to get information about the state of the application.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an electronic device, a controller and a control method for controlling near field communication (NFC) between a reader/writer device and a processing unit running one or more applications, which enable the controller to get information on the information about the state of application(s) running on the processing unit in an simple, efficient and reliable manner. It is a further object of the present disclosure to provide a corresponding electronic system and a medium.

According to an aspect there is provided an electronic device for near field communication (NFC) including a processing unit including one or more applications and a controller for controlling NFC communication between a reader/writer device and the processing unit, said controller including
  a communication unit configured to exchange communication between the external reader/writer device and the processing unit,
  a parsing unit configured to parse communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state, and
  a control unit configured to control said communication unit not to respond to an anti-collision request received from the reader/writer device and/or not to forward an anti-collision request to the processing unit if said anti-collision request is directed to an application in an authenticated state.

According to a further aspect there is provided a control method including
  exchanging communication between the external reader/writer device and the processing unit,
  parsing communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state, and
  controlling said communication not to respond to an anti-collision request received from the reader/writer device and/or not to forward an anti-collision request to the processing unit if said anti-collision request is directed to an application in an authenticated state.

Still further, according to an aspect a corresponding controller is provided. According to a still further aspect, an electronic system is provided including an external reader/writer device and an electronic device as disclosed herein adapted to communicate with the external reader/writer device.

Finally, according to aspects of the present disclosure a computer program including program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the disclosed system, the disclosed method, the disclosed computer program and the disclosed computer-readable recording medium have similar and/or identical preferred embodiments as the claimed controller and as defined in the dependent claims.

The disclosed electronic device, controller and control method are based on the idea to parse the communication between the reader/writer device and the processing unit. Particularly from authentication responses sent by an application to the reader/writer device it can be concluded in which state an application is and/or if it has changed its state. After sending an authentication response by an application the state of the application is generally changed into the authenticated state. From the detection of a response code having a predetermined setting within the authentication response, the authentication response can be distinguished from other communication sent by the application. Consequently, the presence of the response code having a predetermined setting allows the controller to detect if a particular application has changed its state into the authenticated state or not.

If an application has been found to be in the authenticated state (through the detection of said predetermined setting of the response code within an authentication response sent by said application) subsequent anti-collision requests shall not be answered, neither by the controller nor by the processing unit and/or an anti-collision request shall not be forwarded to the processing unit at all. Thus, with the proposed electronic device, controller and control method a simple and efficient way is provided, through which the controller knows about state changes of applications.

It shall be noted that the processing unit (sometimes also referred to as device host or application processor) and the NFC controller may be implemented as separate semiconductor devices/chips. For instance, the processing unit may be implemented as electronic host device, as also disclosed herein as separate element, and the NFC controller may be implemented as NFC chip. In other embodiments both the device host and the NFC controller may be implemented as a common semiconductor device/chip. For instance, the device host and the NFC controller may be implemented as common application processor, i.e. the NFC controller may be integrated into the processing unit that previously only implemented the processing unit.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 11 shows a flowchart illustrating anti-collision handling of the NFC controller after authentication of the UICC in a second embodiment, and FIG. 12 shows an exemplary embodiment of the data format of a notification event sent from the NFC controller to the processing unit.

DETAILED DESCRIPTION OF THE EMBODIMENTS

Figure 1:
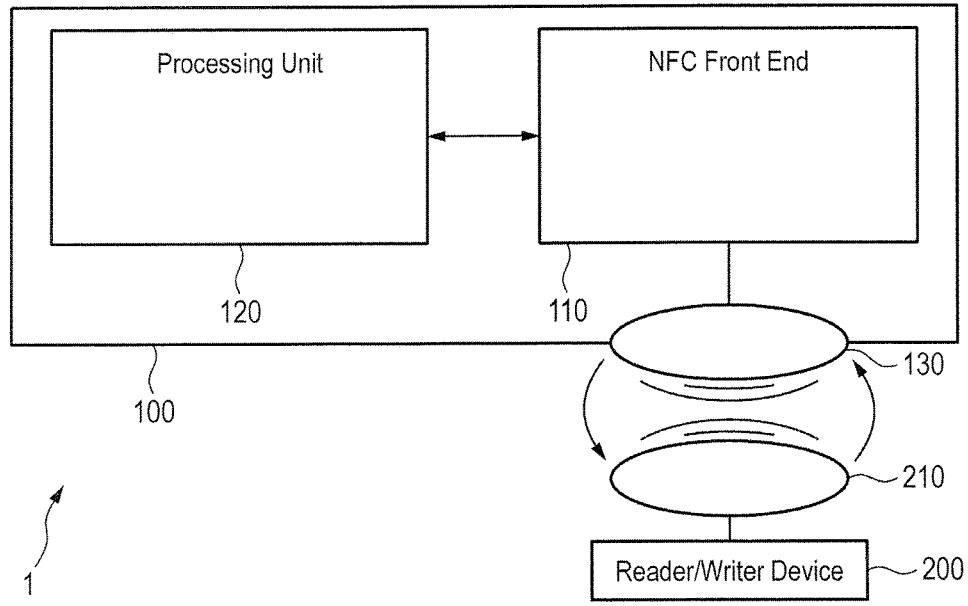
FIG. 1 shows a schematic diagram of an embodiment of a controller, an electronic device and an electronic system according to the present disclosure.

Referring now to the drawings, wherein like reference numerals designate identical or corresponding parts throughout the several views, FIG. 1 shows a schematic diagram of an electronic device 100 and of an NFC system 1 comprising the electronic device 100 and an external reader/writer device 200 according to the present disclosure. The electronic device 100 comprises a front end unit 110 which is adapted to communicate with the external reader/writer device 200. The front end unit 110 may e.g. be an NFC controller as generally described in the above mentioned standard "NFC CONTROLLER INTERFACE (NCI)".

The electronic device 100 further comprises a processing unit 120. The processing unit 120 may e.g. be a central processing unit. The processing unit 120 may also be referred to as "host" or "application processor". Optionally the processing unit 120 may include one or more application specific data structures storing e.g. data related to a payment service such as e.g. a credit card number or the like. It is also possible, that the processing unit 120 is connected to one or more secure elements included in other storages (not shown), e.g. a Subscriber Identity Module (SIM) card. The term "processing unit" should not be understood in a limiting sense to necessarily have high processing capabilities. Depending on the design of electronic device 100, the processing unit 120 may simply be a memory with little processing capabilities.

The electronic device 100 further comprises an NFC interface 130 connected to the front end unit 110. The NFC interface 130 includes e.g. an antenna for transmitting and receiving signals to/from the reader/writer device 200 which likewise includes a further NFC interface 210.

Any device having a front unit 110 and a processing unit 120 and being suitable for NFC communication may be understood as electronic device in the context of the present disclosure. Examples for such electronic devices are particularly all kinds of handheld devices like smartphones, tablet computers, laptops, cameras, etc.

Conventionally, the front end unit 110 and/or the processing unit 120 comprises a memory for storing first and corresponding second identifiers. Further, the processing unit 120 stores one or more applications. This will be explained with reference to FIGS. 2 and 3 showing flowcharts illustrating the conventional communication between the processing unit 120, the front end unit 110 and the external reader/writer device 200.

Figure 2:
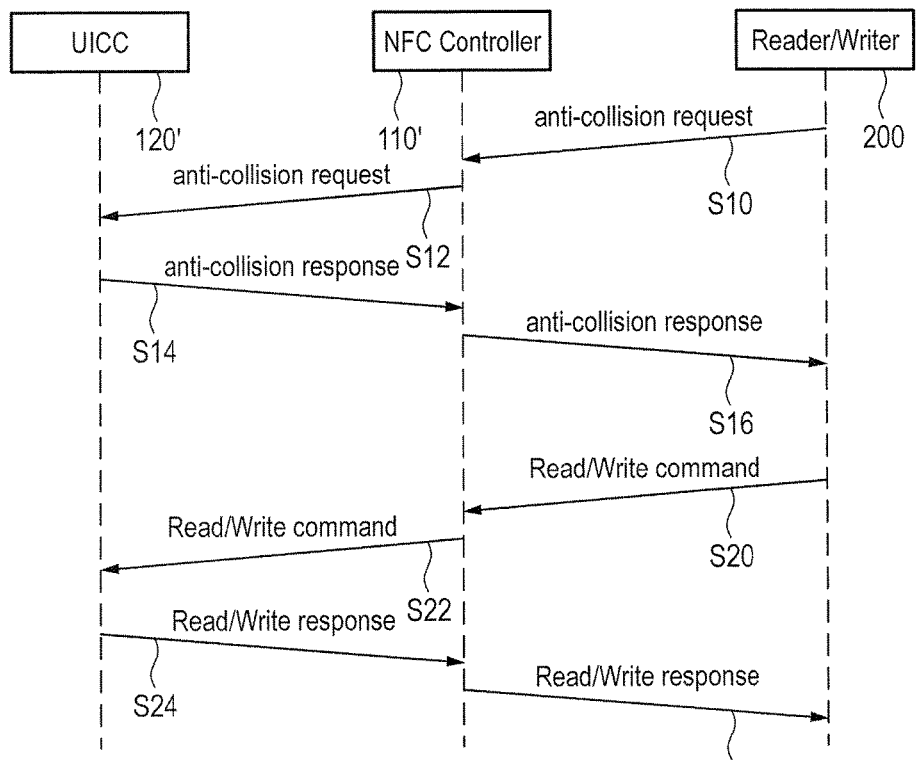
FIG. 2 shows a flowchart illustrating the conventional communication between UICC, NFC controller and external reader/writer device.

FIG. 2 shows a flowchart illustrating the conventional communication between a UICC (Universal Integrated Chip Card, e.g. a SIM card) 120' (as an example of a processing unit), an NFC controller 110' (as an example of an NFC front end unit) and the external reader/writer device 200. When the NFC controller 110' receives a communication establishment request S10 (referred to as anti-collision request in FIG. 2) including a certain first identifier (e.g. a system code), the NFC controller 110' forwards the communication establishment request S12 to the UICC 120'. The UICC stores first identifiers and corresponding second identifiers (e.g. IDs) and sends a corresponding response S14 (referred to as anti-collision response in FIG. 2) including a second identifier. The NFC controller 110' forwards the response S16 to the external reader/writer device 200. Afterwards, the communication is started by forwarding read/write commands (generally referred to as communication commands herein) S20, S22 from the external reader/writer device 200 via the NFC controller 110' to the UICC 120' and by forwarding read/write responses (generally referred to as communication responses herein) S24, S26 from the UICC 120' via the NFC controller 110' to the external reader/writer device 200.

It shall be noted in this context that a special interface may be provided between the NFC Controller 110' and the UICC 120' in order to meet the timing requirements for the anti-collision. Such an interface is e.g. described in the Single Wire Protocol (SWP) specification which is specified in ETSI TS 102 613. The "special mode" that is used is the so-called Contactless Tunneling (CLT) mode. In this embodiment the anti-collision is handled by the UICC 120' itself.

Figure 3:
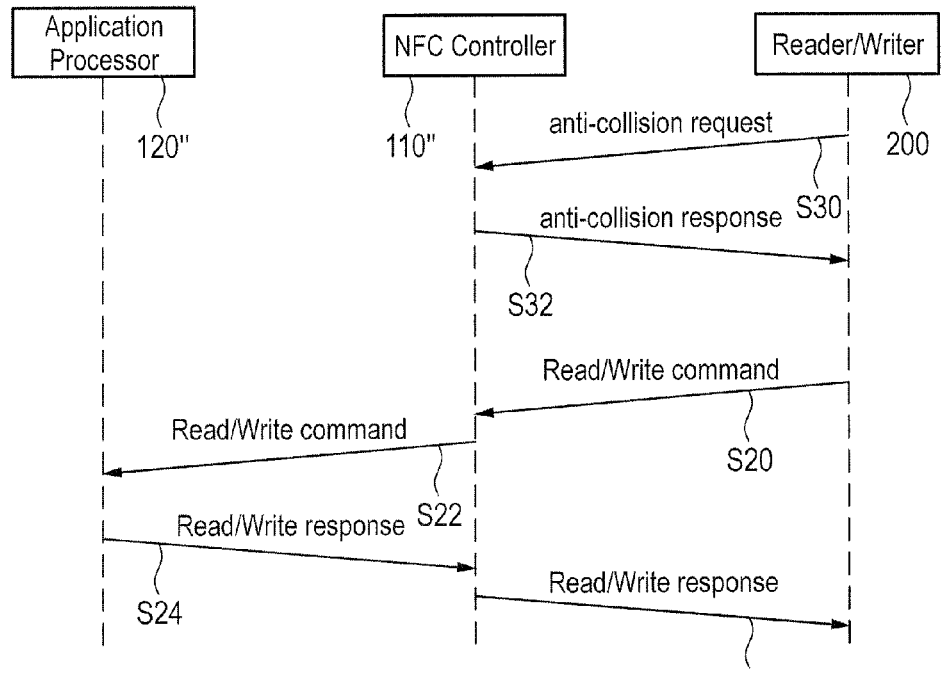
FIG. 3 shows a flowchart illustrating the conventional communication between application processor, NFC controller and external reader/writer device.

FIG. 3 shows a flowchart illustrating another conventional communication between an application processor 120" (as another example of a processing unit, which e.g. runs the operating system), an NFC controller 110" and the external reader/writer device 200. In this embodiment, which e.g. employs HCE (Host-Card Emulation, which describes the capability of the operating system running on the application processor (also named host) to emulate a contactless card), for a device host (DH) on the application processor 120" the information required to handle the anti-collision is configured in the NFC controller 110" so that it can handle the anti-collision autonomously. When the NFC controller 110" receives a communication establishment request S30 including a certain first identifier (e.g. a system code), which is stored in a memory of the NFC controller 110", the NFC controller 110" can immediately respond to the communication establishment request S30 with a response S32 including a respective second identifier. "Immediately" may mean "as soon as possible", "within the next time slot" or "in the time required to send the response" (compared to not responding, re-configuration by the processing unit and the responding on the next command). In some embodiments, the communication protocol between the reader/writer device 200 and the NFC controller 110" may at least partly be time based (time division multiplexed). Subsequently, the communication is performed as explained above with respect to FIG. 2.

The communication establishment request S10, S12, S30 may also be referred to as "anti-collision request" and the response S14, S16, S32 may also be referred to as "anti-collision response". Further, it should be noted that the communication establishment request S20 may be the first request from a reader/writer device for establishing a communication, i.e. when a communication is established no other requests or messages have been exchanged between the reader/writer device 200 and the near field communication device 100. The anti-collision request may be sent at any time and may be used for restarting a connection.

Security related applications, e.g. FeliCa applications, have an internal state which depends on whether the authentication with a Reader/Writer device succeeded or not. The default state is called "Mode 0" (also referred to as non-authenticated state herein), and once the mutual authentication with the reader/writer device is done and the secure connection is established the application is in state "Mode 2" (also referred to as authenticated state herein). An anti-collision request from a reader/writer device shall only be handled in "Mode 0". The "Mode 0" is left as soon as the first authentication command is received. In any other state the anti-collision request is ignored and nothing is sent to the reader/writer device.

Figure 4:
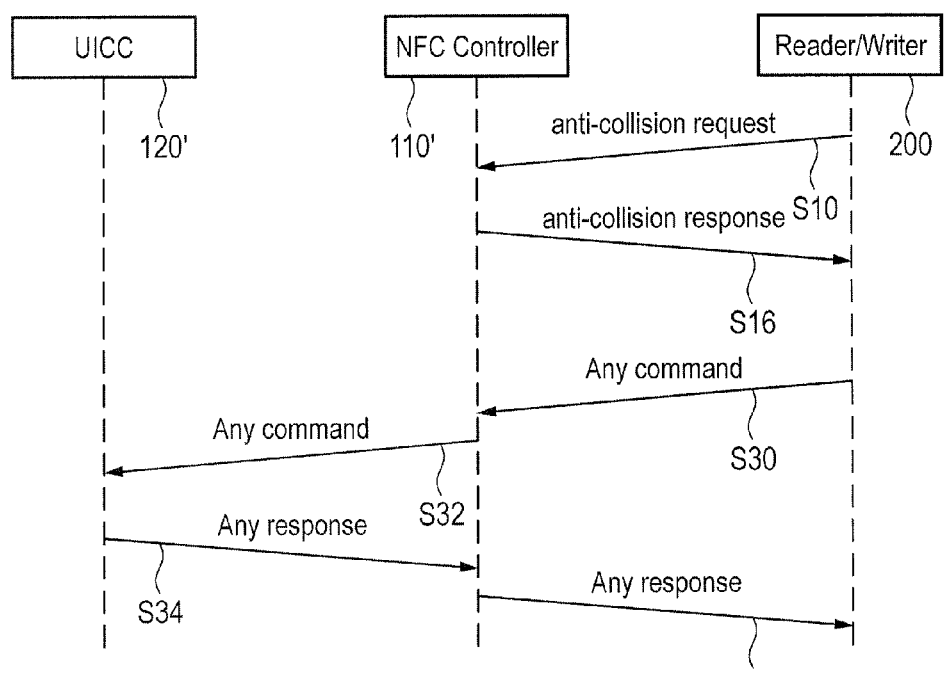
FIG. 4 shows a flowchart illustrating conventional anti-collision handling of the NFC controller.

Assuming the NFC controller 110' was configured with the anti-collision information from the UICC 120' required to run the anti-collision autonomously, then the data flow would look as shown in the flowchart depicted in FIG. 4. After receiving an anti-collision request S10 from the reader/writer device 200, the NFC controller 110' responds directly by an anti-collision response S16 without interaction with the UICC 120'. Subsequently, commands S30, S32 and response S34, S36 are communicated in the same manner as explained above for the read/write command and response.

Figure 5:
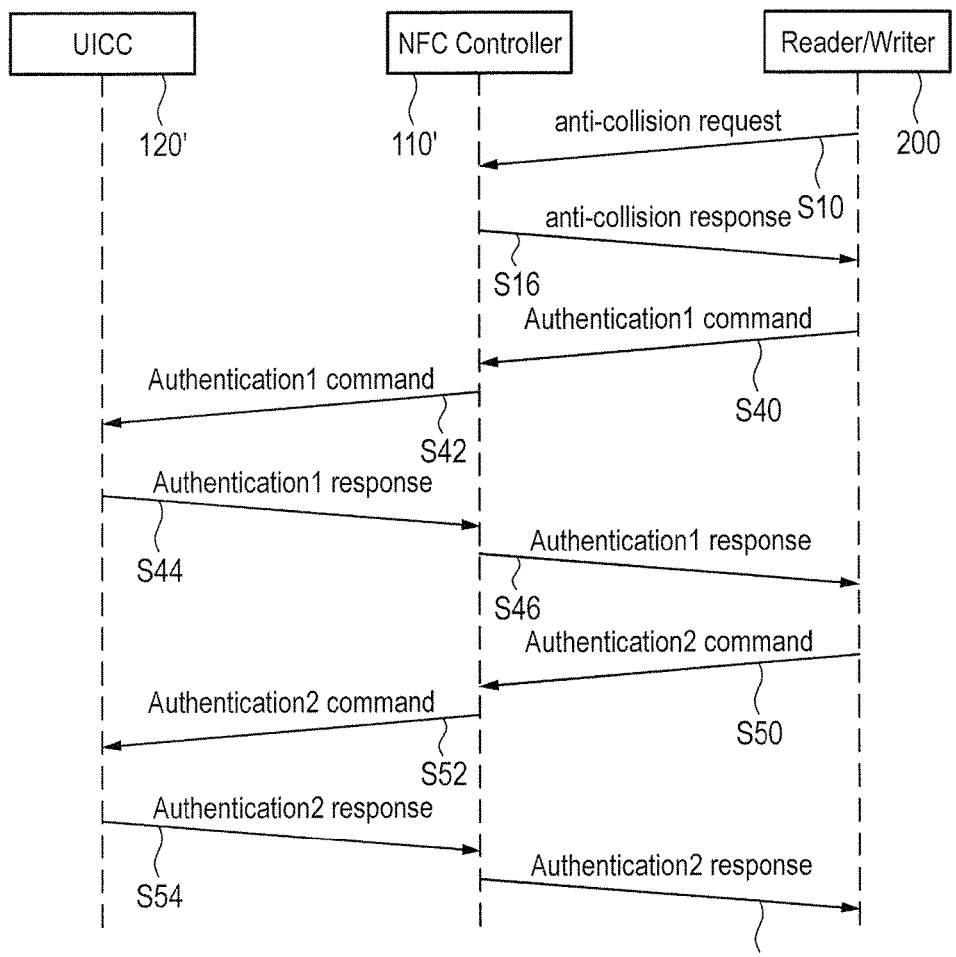
FIG. 5 shows a flowchart illustrating conventional authentication handling of the NFC controller.
Figure 6:
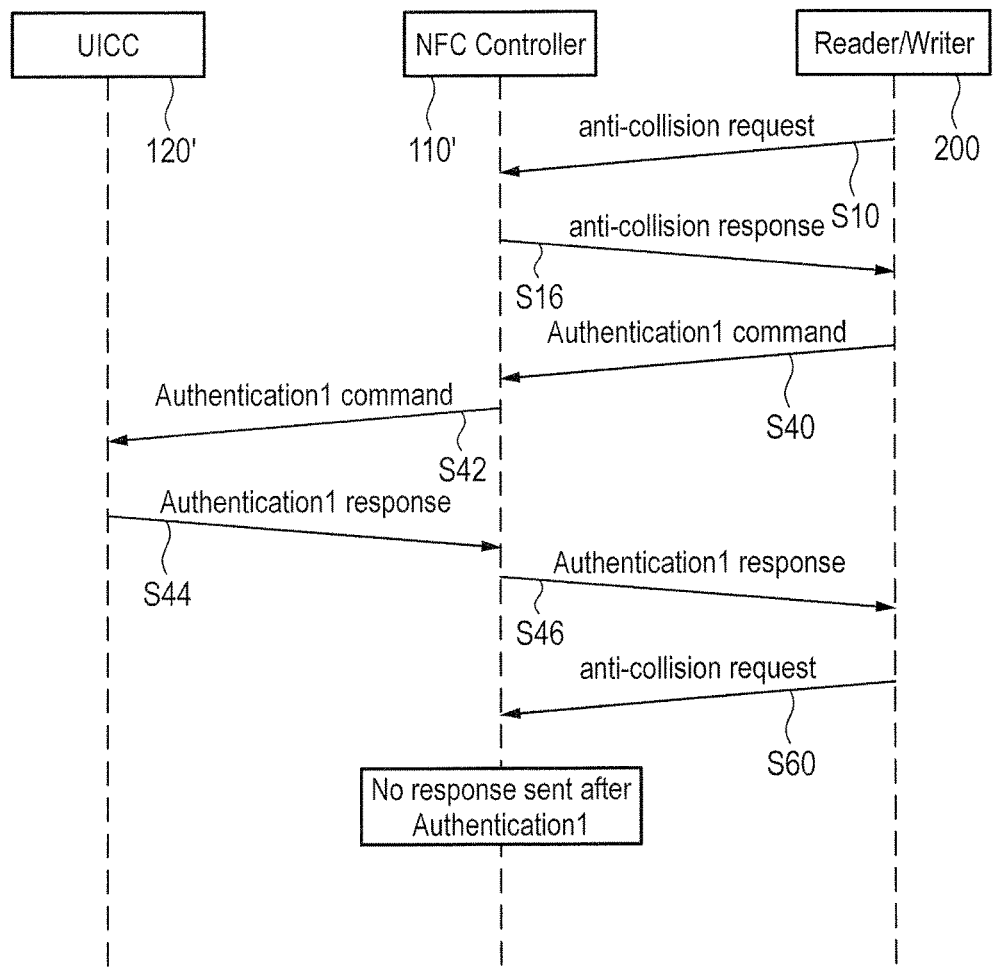
FIG. 6 shows a flowchart illustrating the desired anti-collision handling of the NFC controller after authentication of the UICC.

For security related applications the reader/writer device 200 starts an authentication phase by sending an "Authentication1" command S40 as shown in the flowchart depicted in FIG. 5. This command is forwarded to the UICC 120' (S42), which responds by an "Authentication1" response S44, which is forwarded to the reader/writer device 200 (S46). After that an "Authentication 2" command S50 is sent. This command is forwarded to the UICC 120' (S52) as well, which responds by an "Authentication2" response S54, which is forwarded to the reader/writer device 200 (S56). The application (in this case on the UICC 120') will leave the "Mode 0" as soon as it has sent the "Authentication1" response S44. After that it shall not reply to an anti-collision request S60 any more until e.g. the power is turned off or a different application is accessed. This desired behavior is shown in the flowchart depicted in FIG. 6. This behavior depends on the state of the application. The application, however, runs on the processing unit (e.g. the UICC or DH) but not on the NFC controller so that there is need to provide means that the NFC controller gets this state information. This is addressed by the present disclosure.

Figure 7:
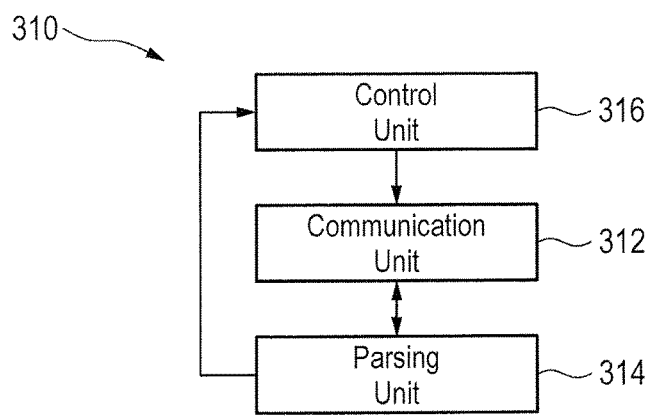
FIG. 7 shows a more detailed schematic diagram of an embodiment of a controller according to the present disclosure.

FIG. 7 shows a schematic diagram of an NFC controller 310 according to the present disclosure. It comprises a communication unit 312 configured to exchange communication between the external reader/writer device and the processing unit (e.g. an application processor, a UICC, etc.).

A parsing unit 314 parses communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state. A control unit 316 controls said communication unit 312 not to respond to an anti-collision request received from the reader/writer device and/or not to forward an anti-collision request to the processing unit if said predetermined setting of the response code has been detected. This embodiment of the NFC controller 310 thus provides the behavior as shown in the flowchart depicted in FIG. 6.

Thus, according to the present disclosure, since the NFC controller 310 forwards commands and responses in both directions, it parses those frames, in particular authentication responses, and concludes on the application state of the application. As mentioned above, the application state is changed after sending the "Authentication1" response, which can thus be recognized by the NFC controller. In this context, it shall be noted that a "frame" is understood as a logical data structure or message that is sent and received. A frame can be either a command, or a response, or an event, i.e. commands, response and events are transported in frames. The NFC controller particularly parses the frames coming from the application processor (e.g. a device host and/or an UICC) in order to detect an authentication response.

Figure 8A:
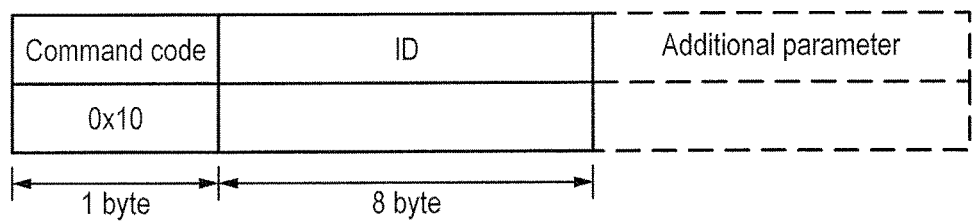
FIG. 8 shows exemplary embodiments of an "Authentication1" command frame and an "Authentication1" response frame.
Figure 8B:
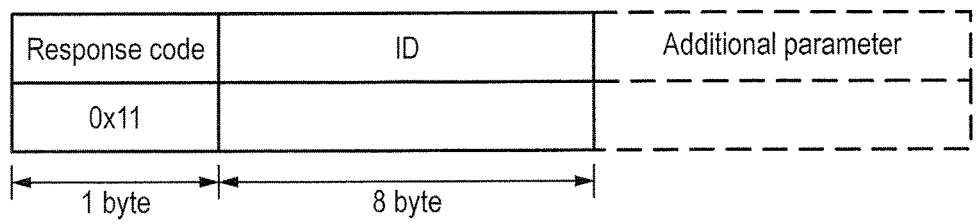

An exemplary embodiment of an "Authentication1" command frame is depicted in FIG. 8A and an exemplary embodiment of an "Authentication1" response frame is depicted in FIG. 8B, wherein "ID" indicates the identifier of the application (also called second identifier herein). Command payload and command dependent information is included in the additional parameter field. If the NFC controller detects a response with the response code set to 0x11, then it knows that the application has left the "Mode 0" state and that the corresponding identifiers within anti-collision requests (e.g. as recorded in a table of (first) identifiers together with corresponding entries carrying state information of the respective applications) are to be ignored, i.e. that the NFC controller shall not respond to anti-collision requests or forward anti-collision requests directed to the same application in the processing unit.

Figure 9:
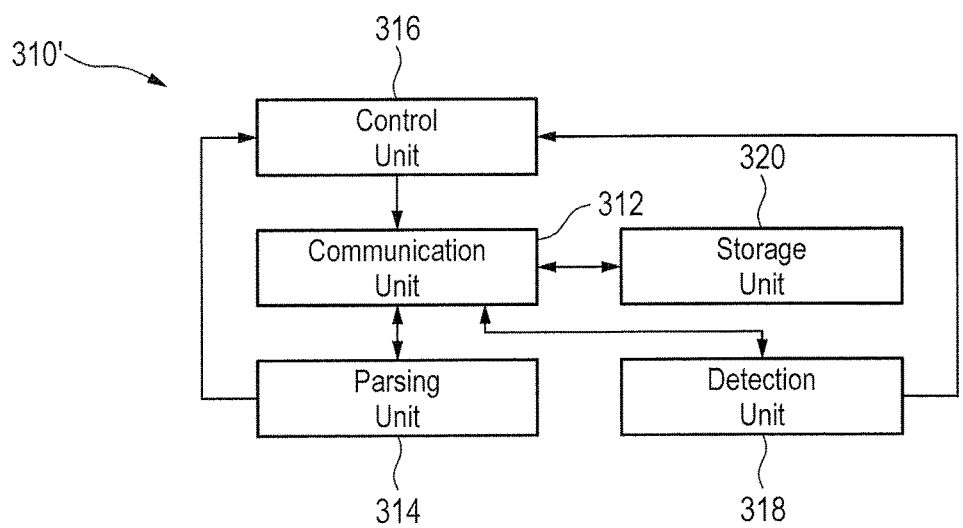
FIG. 9 shows a more detailed schematic diagram of another embodiment of a controller according to the present disclosure.

Preferably, the NFC controller also detects the conditions under which the state of an application changes back to "Mode 0", i.e. to the non-authenticated state. In this case the NFC controller does no longer prevent responses to anti-collision requests. A corresponding detection unit 318 is shown in FIG. 9 depicting another embodiment of an NFC controller 310' according to the present disclosure. Optionally, said embodiment further comprises a storage unit 320 for storing a IDs of applications and the corresponding state information indicating in which state the application is or for storing the ID of the application that is in the authenticated mode or the IDs of applications that are in the non-authenticated mode.

Several options are available for detecting this change. According to one option a change of the state of an application happens if there is an RF off, i.e. the RF field generated by the external reader/writer device 200 has gone away or has become too weak to communicate with it. This can e.g. be detected by the NFC interface (130 in FIG. 1). As soon as the RF field is gone there is e.g. an event sent from the NFC controller to the processing unit or, e.g. in case of a SIM, the power is gone.

Figure 10:
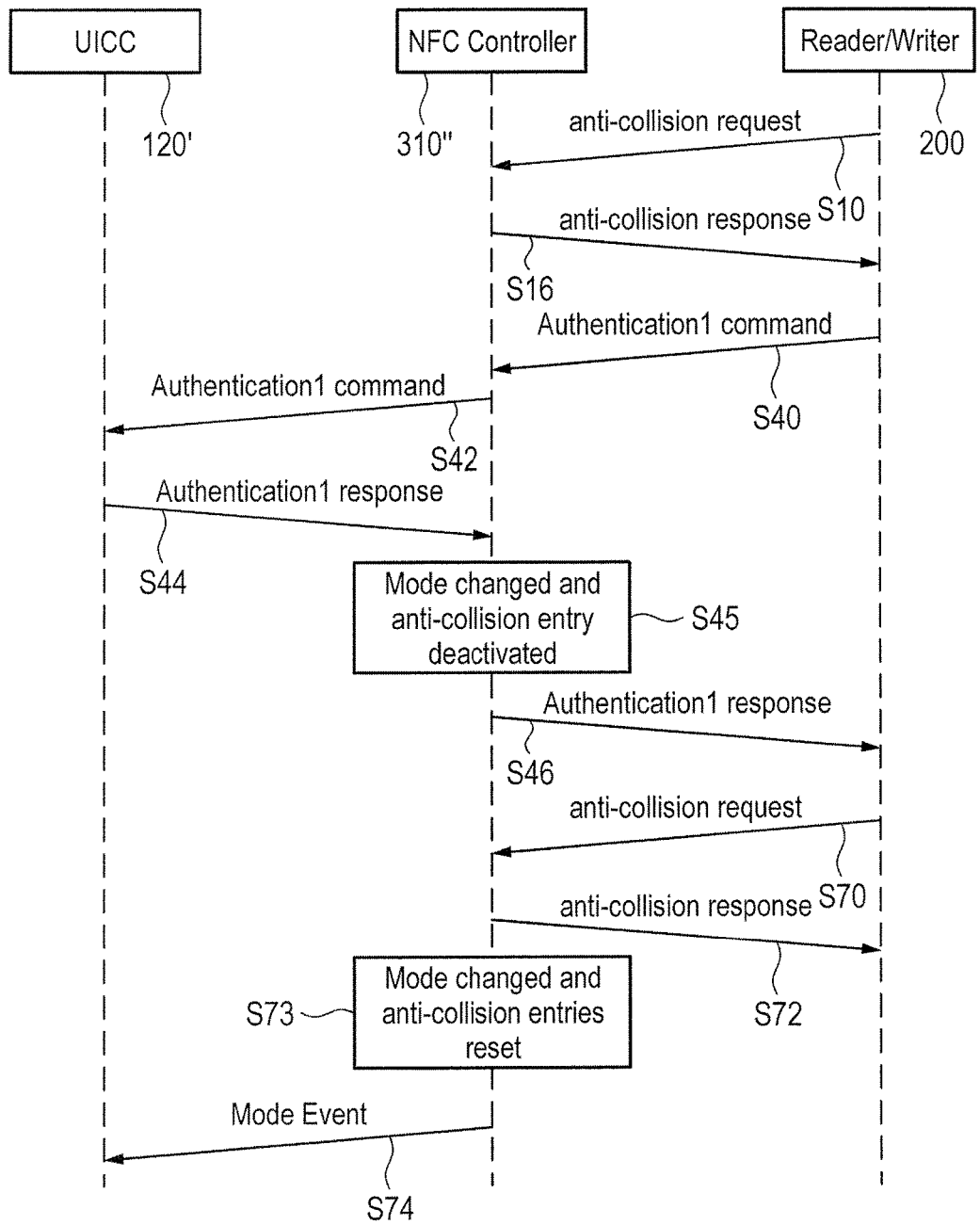
FIG. 10 shows a flowchart illustrating anti-collision handling of the NFC controller after authentication of the UICC in a first embodiment.

According to another option a change of the state of an application happens if another anti-collision response is sent in case of an anti-collision request targeting another application than the one in "Mode 1" or "Mode 2", i.e. the one in authenticated state. This is illustrated in the flowchart shown in FIG. 10. After detecting and parsing the "Authentication1" response S44 the NFC controller 310" knows that the (first) application has changed its state into authenticated state (herein, Mode 0 is considered the non-authenticated state whereas all other states, i.e. Mode 1, Mode 2 and Mode 3 are considered authenticated states) and deactivates the anti-collision entry (S45), i.e. does no longer respond to anti-collision requests directed to said (first) application. If another anti-collision request S70 is received by the NFC controller 310" that is directed to establishing a communication with a different (second) application, the NFC controller 310" resets the state information for the first application to non-authenticated state (S73). In addition, the NFC controller 310" answers the anti-collision request S70 by an anti-collision response S72. Optionally, a change information ("Mode Event") S74 is sent to the (first) application on the UICC 120' to inform it of the change of the state information of the NFC controller 310". Hence, either the Mode Event or a command directed to a different application is received by the UICC 120' after step S73 so that the first application in this case knows that it should change its mode. The UICC 120' thus "selects" the new application and "deselects" the first application.

According to still another option a change of the state of an application happens if a response to any command is sent that was addressed to another application than the one being in "Mode 1" or "Mode 2". This is illustrated in the flowchart shown in FIG. 10. According to this option all responses from applications are monitored and the identifiers (aka IDm, NFCID2) of the applications (i.e. on the UICCs 120', 121', . . . ) are checked by the NFC controller 310'". If the identifier within a response belongs to an application that is in Mode 0, i.e. in the non-authenticated state and not in Mode 1, 2 or 3, then the NFC controller 310'" resets the state information of all applications (back to "Mode 0") and enables all anti-collision entries (S85).

For instance, as shown in FIG. 11, if a read/write command S80, S82 that is directed to an application on UICC 121' (or, alternatively, to a second application on the UICC 120'), i.e. to an application that is in the non-authenticated state (Mode 0), and the NFC controller 310'" detects a read/write response S84 from said application the state information in the NFC controller for all applications is changed to the non-authenticated state (Mode 0) and subsequent anti-collision request will be handled by the NFC controller 310'". Further, the read/write response S86 is forwarded to the reader/writer device 200.

The NFC controller can follow different approaches to achieve this function (assuming one application is in authenticated state, i.e. in "Mode 1", "Mode 2" or "Mode 3").

According to a first approach, if the NFC controller is aware of all identifiers (IDs) of all applications of the device (i.e. either the whole device, e.g. a mobile phone, comprising one or more processing units (DH and UICC), or a subset of the device, i.e. just one processing unit; this is up to the implementation), then it can check whether a response contains an ID of one of the available applications being in non-authenticated stated (i.e. in Mode 0). If so, the NFC controller re-enables the anti-collision entry of the application being in authenticated state (i.e. not in Mode 0). If the ID is different, it must be either an encrypted or non-encrypted response from the application being in authenticated state, i.e. being in Mode 1, Mode 2 or Mode 3, and the NFC controller can ignore it.

According to a second approach the NFC controller buffers the ID of the "Authentication1" response (as shown above) and checks whether subsequently a non-encrypted response (indicating that the corresponding application is in a non-authenticated state) with a different ID is sent. In this case not only the ID but also the response code should be monitored, for instance in a table stored in an optional storage unit (320 in FIG. 9) in order to detect the non-encrypted response. However, the NFC controller generally does not need to store a complete list of IDs.

As explained above and shown in FIG. 10 an additional event S74 sent from the NFC controller to the processing unit, e.g. the UICC, may be used to inform about the status change of the one or more anti-collision entry/entries, i.e. the change of the state information within the NFC controller. Preferably, such an event comprises at least the system code (i.e. the first identifier), which is part of the anti-collision data, and/or the ID (i.e. the second identifier), and information (called state information herein) whether the anti-collision entry is enabled or disabled. An exemplary embodiment of the event's data format is depicted in FIG. 12.

This event can be used by an application to reset the internal state. Alternatively, a generic event can be used, e.g. an event that indicates that e.g. the RF field was switched off, to indicate that not only one specific entry was disabled but that the state for all applications can be reset.

In summary, the present disclosure describes devices, systems and methods to provide that the NFC controller can gather information about the application state. This information is required to handle the anti-collision request in the NFC controller correctly. By handling the anti-collision in the NFC controller completely, the SWP CLT mode as defined in ETSI TS 102 613 is not required any more.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. An electronic device for near field communication, NFC, said device including a processing unit including one or more applications and a controller for controlling NFC communication between a reader/writer device and the processing unit, said controller including:
   to exchange communication between the external reader/writer device and the processing unit,
   to parse communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state, and
   a control unit configured to control said communication unit not to respond to an anti-collision request received from the reader/writer device and/or not to forward an anti-collision request to the processing unit if said anti-collision request is directed to an application in an authenticated state.

2. The electronic device as defined in embodiment 1, wherein said controller further includes a storage unit configured to store identifiers of applications and a corresponding state information indicating if an application is in an authenticated state or not.

3. The electronic device as defined in any preceding embodiment,
   wherein said controller further includes a detection unit configured to detect a change of an application from an authenticated state to a non-authenticated state and/or from a non-authenticated state to an authenticated state.

4. The electronic device as defined in embodiments 2 and 3,
   wherein said storage unit is configured to change the stored state information of an application if a change of said application from an authenticated state to a non-authenticated state and/or from a non-authenticated state to an authenticated state has been detected.

5. The electronic device as defined in embodiment 3,
   wherein said detection unit is configured to detect a change of an application from an authenticated state to a non-authenticated state by detecting if an RF field of the reader/writer device disappeared or has become too weak for communication with the controller and/or the processing unit.

6. The electronic device as defined in embodiment 3,
wherein said detection unit is configured to detect a change of an application from an authenticated state to a non-authenticated state by detecting another anti-collision response sent by another application or processing unit in response to an anti-collision request.

7. The controller as defined in embodiment 3,
wherein said detection unit is configured to detect a change of an application from an authenticated state to a non-authenticated state by detecting a response sent by an application in response to a command from the reader/writer device.

8. The electronic device as defined in embodiments 2 and 7,
wherein said storage unit is configured to change the stored state information of all applications of the same processing unit or of all processing units, for which applications the stored state information indicates that the application is in the authenticated state, to a state information indicating that the application is in the non-authenticated state, if a response sent by an application in response to a command from the reader/writer device has been detected and the state information of said application indicates that said application is in a non-authenticated state.

9. The electronic device as defined in embodiment 2,
wherein said communication unit is configured to send a state change notification to an application if the stored state information of said application is changed.

10. The electronic device as defined in any preceding embodiment,
wherein the state of an application is indicated by a contactless tunneling mode.

11. A controller for controlling near field communication, NFC, between a reader/writer device and a processing unit including one or more applications, said controller including:
    a communication unit configured to exchange communication between the external reader/writer device and the processing unit,
    a parsing unit configured to parse communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state, and
    a control unit configured to control said communication unit not to respond to an anti-collision request received from the reader/writer device and/or not to forward an anti-collision request to the processing unit if said anti-collision request is directed to an application in an authenticated state.

12. A control method for controlling near field communication, NFC, between a reader/writer device and a processing unit including one or more applications, said control method including:
    exchanging communication between the external reader/writer device and the processing unit,
    parsing communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state, and
    controlling said communication not to respond to an anti-collision request received from the reader/writer device and/or not to forward an anti-collision request to the processing unit if said anti-collision request is directed to an application in an authenticated state.

13. A non-transitory computer-readable recording medium that stores therein a computer program product, which, when executed by a processor, causes the method according to embodiment 12 to be performed.

14. An electronic system for near field communication, NFC, said system including:
    an external reader/writer device and
    an electronic device as defined in embodiment 1 adapted to communicate with the external reader/writer device.

15. A computer program including program code means for causing a computer to perform the steps of said method according to embodiment 12 when said computer program is carried out on a computer.

The invention claimed is:

1. An electronic device for near field communication, NFC, said device comprising:
    a processing unit including one or more applications and
    a controller for controlling NFC communication between a reader/writer device and the processing unit, said controller comprising:
        a communication unit configured to exchange communication between the reader/writer device and the processing unit,
        a parsing unit configured to parse communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state, and
        a control unit configured to control said communication unit not to respond to an anti-collision request received from the reader/writer device and/or not to forward an anti-collision request to the processing unit if said anti-collision request is directed to an application in an authenticated state.

2. The electronic device as claimed in claim 1,
wherein said controller further comprises a storage unit configured to store identifiers of applications and a corresponding state information indicating if an application is in an authenticated state or not.

3. The electronic device as claimed in claim 2,
wherein said storage unit is configured to change the stored state information of an application if a change of said application from an authenticated state to a non-authenticated state and/or from a non-authenticated state to an authenticated state has been detected.

4. The electronic device as claimed in claim 2,
wherein said storage unit is configured to change the stored state information of all applications of the same processing unit or of all processing units, for which applications the stored state information indicates that the application is in the authenticated state, to a state information indicating that the application is in the non-authenticated state, if a response sent by an application in response to a command from the reader/writer device has been detected and the state information of said application indicates that said application is in a non-authenticated state.

5. The electronic device as claimed in claim 2, wherein said communication unit is configured to send a state change notification to an application if the stored state information of said application is changed.

6. The electronic device as claimed in claim 1, wherein said controller further comprises a detection unit configured to detect a change of an application from an authenticated state to a non-authenticated state and/or from a non-authenticated state to an authenticated state.

7. The electronic device as claimed in claim 6, wherein said detection unit is configured to detect a change of an application from an authenticated state to a non-authenticated state by detecting if an RF field of the reader/writer device disappeared or has become too weak for communication with the controller and/or the processing unit.

8. The electronic device as claimed in claim 6, wherein said detection unit is configured to detect a change of an application from an authenticated state to a non-authenticated state by detecting another anti-collision response sent by another application or processing unit in response to an anti-collision request.

9. The electronic device as claimed in claim 6, wherein said detection unit is configured to detect a change of an application from an authenticated state to a non-authenticated state by detecting a response sent by an application in response to a command from the reader/writer device.

10. The electronic device as claimed in claim 1, wherein the state of an application is indicated by a contactless tunneling mode.

11. An electronic system for near field communication, NFC, said system comprising:
an external reader/writer device; and
an electronic device as claimed in claim 1 adapted to communicate with the external reader/writer device.

12. A controller for controlling near field communication, NFC, between a reader/writer device and a processing unit including one or more applications, said controller comprising:
a communication unit configured to exchange communication between the reader/writer device and the processing unit,
a parsing unit configured to parse communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state, and
a control unit configured to control said communication unit not to respond to an anti-collision request received from the reader/writer device and/or not to forward an anti-collision request to the processing unit if said anti-collision request is directed to an application in an authenticated state.

13. A control method for controlling near field communication, NFC, between a reader/writer device and a processing unit including one or more applications, said control method comprising:
exchanging communication between the reader/writer device and the processing unit,
parsing communication exchanged between the reader/writer device and the processing unit, wherein the parsing unit is configured to detect a predetermined setting of a response code within an authentication response sent by the processing unit in response to an authentication request received from the reader/writer device, said predetermined setting indicating that an application of the processing unit is in an authenticated state, and
controlling said communication not to respond to an anti-collision request received from the reader/writer device and/or not to forward an anti-collision request to the processing unit if said anti-collision request is directed to an application in an authenticated state.

14. A non-transitory computer-readable recording medium that stores therein a computer program product, which, when executed by a processor, causes the method according to claim 13 to be performed.

* * * * *